United States Patent
Tamura et al.

(10) Patent No.: US 12,399,641 B2
(45) Date of Patent: Aug. 26, 2025

(54) STORAGE MIGRATION METHOD AND STORAGE SYSTEM

(71) Applicant: Hitachi, Ltd., Tokyo (JP)

(72) Inventors: Yoshiki Tamura, Tokyo (JP); Hiroshi Miki, Tokyo (JP); Yusuke Nonaka, Tokyo (JP); Yudai Takayama, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 0 days.

(21) Appl. No.: 18/595,610

(22) Filed: Mar. 5, 2024

(65) Prior Publication Data

US 2025/0028470 A1    Jan. 23, 2025

(30) Foreign Application Priority Data

Jul. 18, 2023   (JP) ................. 2023-116552

(51) Int. Cl.
*G06F 3/06* (2006.01)

(52) U.S. Cl.
CPC .......... *G06F 3/0647* (2013.01); *G06F 3/0604* (2013.01); *G06F 3/0683* (2013.01)

(58) Field of Classification Search
CPC ..... G06F 3/0647; G06F 3/0604; G06F 3/0683
See application file for complete search history.

(56) References Cited

U.S. PATENT DOCUMENTS

| 2015/0012697 A1* | 1/2015 | Enohara | ............... G06F 3/0682 711/111 |
| 2022/0100424 A1 | 3/2022 | Tatsumi et al. | |

FOREIGN PATENT DOCUMENTS

JP    2022-055614 A    4/2022

* cited by examiner

*Primary Examiner* — Chie Yew
(74) *Attorney, Agent, or Firm* — Volpe Koenig

(57) ABSTRACT

There is provided a storage migration method including sending, by a maintenance PC, a power-off instruction for migration to a migration source storage, sending, by the migration source storage, storage configuration information to the maintenance PC, turning off the power of the migration source storage when it is confirmed that the maintenance PC has received the storage configuration information, sending, by the maintenance PC, the storage configuration information and a power-on instruction for migration to a migration destination storage, and outputting, by the maintenance PC, a migration completion notification when a disk drive relocated from the migration source storage can be confirmed to be set in the migration destination storage.

9 Claims, 12 Drawing Sheets

FIG.10

| LOCATION | SLOT | STATE | USAGE | DRIVE TYPE/RPM/CAPACITY | DRIVE TYPE CODE | NOTIFICATION |
|---|---|---|---|---|---|---|
| HD00-00 | 00 | ○Normal | DATA | SAS/15Krpm/200GM | DKR2G-K200SS | |
| HD00-0 | | | | OFFLINE DIP | | SS |
| HD00-0 | | DRIVE IS NOT INSTALLED AT CORRECT | | | | SS | SLOT 05 |
| HD00-0 | | POSITION. PLEASE REINSTALL DRIVE IN SLOT | | | | SS | |
| HD00-0 | | DISPLAYED IN 'NOTIFICATION' FOR EACH DRIVE | | | OK | SS | SLOT 06 |
| HD00-05 | 05 | ●Blocked | DATA | SAS/15Krpm/200GM | DKR2G-K200SS | SLOT 02 |
| HD00-06 | 06 | ●Blocked | DATA | SAS/15Krpm/200GM | DKR2G-K200SS | SLOT 04 |

CONTROLLER CHASSIS    LAST UPDATE :2022 12 30 23:14:25

CHB-2A CHB-2B CHB-2C CFM-2
CHB-1A CHB-1B CHB-1C CFM-1

FRONT     BACK

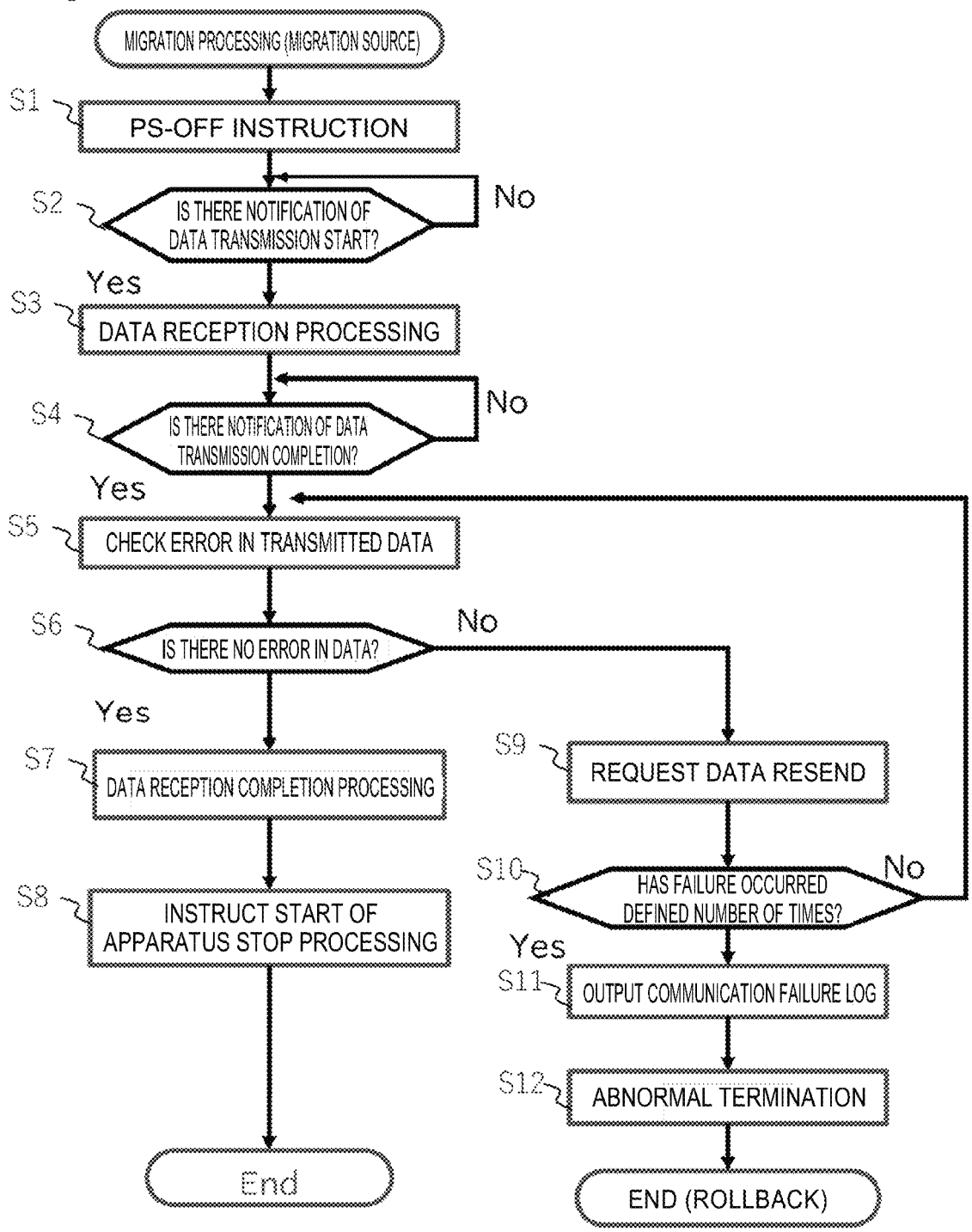

STORAGE MIGRATION METHOD AND STORAGE SYSTEM

BACKGROUND OF THE INVENTION

1. Field of the Invention

The present invention relates to a storage migration method and a storage system.

2. Description of the Related Art

JP-2022-55614-A discloses an invention of a storage system including a node including a plurality of storage control units (storage controllers) each including a processor, a memory, and a port, and a storage drive, in which each of the plurality of storage control units requests data access and transmits and receives data with respect to a host computer via a plurality of ports, a plurality of processors process input and output data from the host computer, a plurality of memories hold control information for accessing data in the storage drive, and the storage system transmits the control information stored in the memories to another node, stores the control information in the memories of the storage control units of the other node, and sets ports of the other node in consideration of a relation between the storage control units and the ports of the node, in a case in which the other node can access data relating to the control information.

SUMMARY OF THE INVENTION

JP-2022-55614-A discloses that, in the multi-controller storage system, the hardware and software of the system are updated without interruption and reductions in redundancy and performance.

That is, it is conceivable that, through a software update, new features are added, or the manageable number of resources is expanded, in general.

That is, the format of control information in the old software does not define an area for control information to be used by the new software. Thus, first, a new storage controller is added. Before the new software starts operating, the old software rewrites the control information in the old format to the control information in the new format while continuing I/O operations. When the conversion to the control information in the new format is completed, the new software accesses the control information in the new format obtained through the conversion.

However, when migration to the new storage controller is performed, the operating storage controller does not necessarily have the function to access the storage drives managed by the new storage controller (for example, the internal drives embedded in the storage controller). Thus, when a storage is migrated to the new storage controller, it is necessary to transmit the data stored in the operating drives from the operating storage controller to the new storage controller using a network and write the data to the new drives managed by the new storage controller.

Such a process is time-consuming as requiring massive data communication, which has been a problem. Further, when data updates are performed in the migration source during this time, it is necessary to reflect the update content in the migration destination drives, which has also been a problem.

It is an object of the present invention to migrate a storage controller in a short time.

A storage migration method according to the present invention is a storage migration method for a storage system, the storage system including a plurality of storage controllers each including a processor and a memory, and a plurality of storage media configured to store data, the storage media each being managed by a corresponding one of the storage controllers. Each of the plurality of storage controllers requests data access and transmits and receives data with respect to a host computer. A plurality of the processors of the storage controllers process data input or output to the storage media by the host computer. A plurality of the memories of the storage controllers hold control information referred to by the processors to access the data stored in the storage media. A storage migration control apparatus is connected to the plurality of storage controllers. The storage migration control apparatus transmits a transfer instruction for the control information to a migration source storage controller among the plurality of storage controllers. A processor of the migration source storage controller transmits, on the basis of the transfer instruction, the control information to the storage migration control apparatus. The storage migration control apparatus transmits, to a migration destination storage controller different from the migration source storage controller among the plurality of storage controllers, the migration instruction for the control information and the control information. A processor of the migration destination storage controller determines whether a storage medium managed by the migration source storage controller has been relocated to the migration destination storage controller on the basis of the control information received.

According to the present invention, it is possible to update the storage controller in a short time. The problems, configurations, and effects other than those described above are to be clarified from the following description of an embodiment.

BRIEF DESCRIPTION OF THE DRAWINGS

FIG. 10 is an example of a drive position error notification screen in the embodiment of the present invention;

FIG. 11 is an example of a flowchart illustrating data transfer processing from a migration source storage in the embodiment of the present invention.

DESCRIPTION OF THE INVENTION

Now, an embodiment of the present invention is described with reference to the drawings. Note that, in each figure for describing the embodiment, the identical components are denoted by identical names and reference symbols as much as possible to omit repeated descriptions thereof.

The present invention is not limited to the embodiment described below and includes various modified examples and equivalent configurations within the gist of the appended claims. For example, the embodiment described earlier is described in detail to clearly describe the present invention, and the present invention is not necessarily limited to including all the described components.

Further, the processing units described in the embodiment may be, in whole or in part, designed using integrated circuits, for example, to be implemented as hardware. Alternatively, the processing units may be implemented as software by a processor interpreting and executing programs for implementing the respective functions.

The tables, areas, and the like described in the embodiment may be a database (DB) or data stored in the main memory.

In the present invention, instead of performing migration from a migration source storage controller to a migration destination storage controller while the migration source CTL is operating, as in JP-2022-55614-A, the necessary information for migration in a migration source CTL is downloaded to a storage maintenance personal computer (PC), and the power of the migration source CTL is turned off.

After that, the necessary information for migration downloaded to the storage maintenance PC is uploaded to a migration destination, the disk drives stored in the storage box of the migration source CTL are removed, and the removed disk drives are set in the storage box of the migration destination CTL.

Then, after setting the necessary information for migration, the migration destination CTL is powered on.

Embodiment

Figure 1:
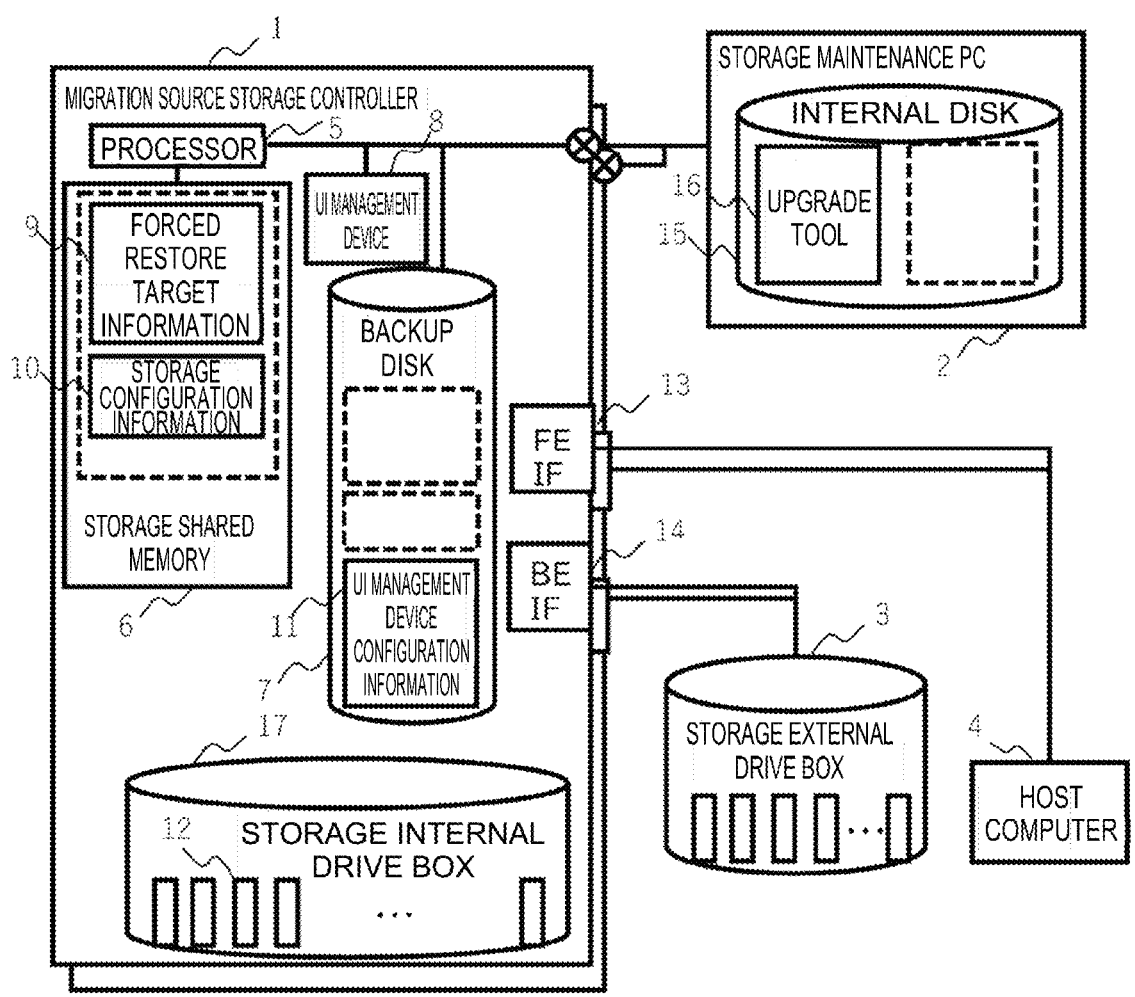
FIG. 1 is a system configuration diagram of a migration source storage system in an embodiment of the present invention.

FIG. 1 is a system configuration diagram of a migration source storage system in the embodiment of the present invention. A migration source storage controller 1 (hereinafter referred to as "migration source CTL") includes a processor 5 implemented by a central processing unit (CPU) or the like, a storage shared memory 6, a user interface (UI) management device 8, a backup disk 7, and a storage internal drive box 17 (storage medium storage unit) having stored therein disk drives 12 (storage media). Note that FIG. 1 illustrates two systems of the migration source CTLs and both the systems have the same configuration described above.

In the storage shared memory 6, forced restore target information 9 and storage configuration information 10 are stored, while UI management device configuration information 11 is stored in the backup disk 7.

Further, the migration source CTL is connected to a storage external drive box 3 via a back-end interface (BEIF) 14.

Moreover, the migration source CTL is connected to a host computer 4 configured to access the storage via a front-end interface (FEIF) 13.

In the present embodiment, a description is given on an example in which a storage maintenance PC 2 (storage migration control apparatus) including an internal disk 15 having stored therein an upgrade tool 16 is connected to the migration source CTL and a migration destination CTL via a network, and migration from the migration source CTL is performed.

Figure 2:
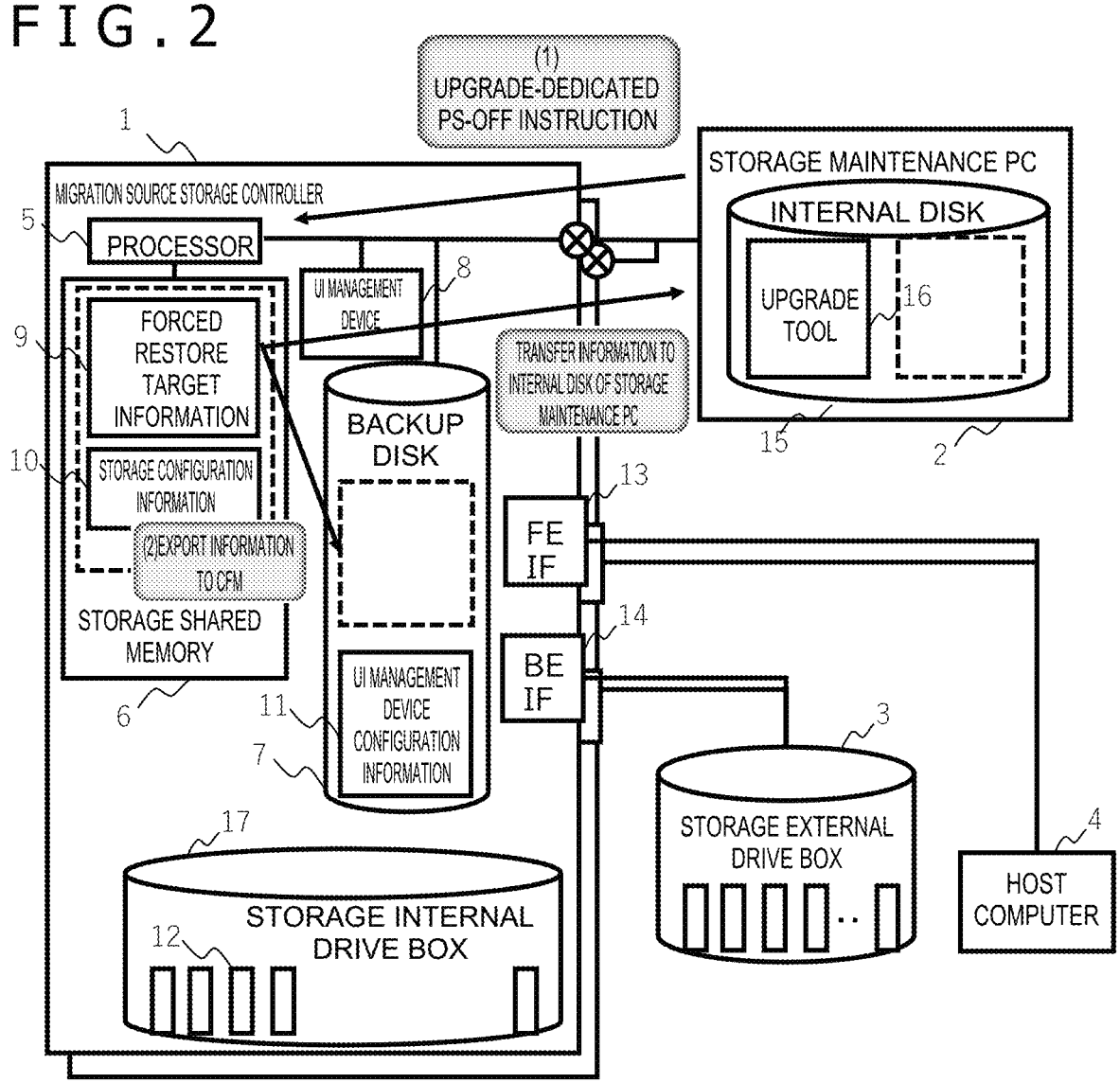
FIG. 2 is Migration Procedure 1 in the embodiment of the present invention.

With reference to FIG. 2 to FIG. 7, the migration procedure of the storage controller is described step by step. FIG. 2 illustrates Migration Procedure 1 that is the backup processing of data performed in the migration source CTL 1. To prevent a loss of necessary data during migration, a controller migration-dedicated PS-OFF instruction is sent to the processor 5 of the migration source CTL from the storage maintenance PC 2 (processing (1)). On the basis of the controller migration-dedicated PS-OFF instruction, the processor 5 of the migration source CTL executes the pieces of processing (2) to (5) described below.

The processor 5 of the migration source CTL transmits the forced restore target information 9 and the storage configuration information 10 stored in the storage shared memory 6 to the backup disk 7 (processing (2)). The backup disk 7 includes, for example, a configuration flash memory (CFM).

The forced restore target information 9, the storage configuration information 10, and the UI management device configuration information 11 stored in the backup disk 7 are transferred to the internal disk of the storage maintenance PC via the network and stored in the internal disk 15 (processing (3)).

The forced restore target information 9 includes information necessary for using programs in the migration destination storage with the same settings as the migration source storage, such as information on the settings and licenses of the programs used in the storage, and differential information on the volumes used by the programs, and the like.

Specific examples include setting information regarding a program for a volume allocation function based on volume hierarchy management, the access frequency of data, or the host computer, and differential information or fault log information on data in association with volume copying.

The storage configuration information 10 is information summarizing the usage status (setting information) of the hardware resources used in the storage or information necessary for reusing the hardware resources used in the migration source storage in the migration destination storage, while maintaining the same setting state.

Specifically, the storage configuration information 10 includes necessary information even for regular maintenance operations to start up the apparatus obtained by recording the settings with which the apparatus has been operating such as apparatus configuration information including the number of Micro Processors (MPs) and the number of installed interface packages (IFPKs), host group information, port information, logical volumes (LDEVs), and parity group information, slot numbers corresponding to location information on the drives, drive information that is drive-specific information such as drive serial numbers corresponding to the slot numbers, model information on the apparatus, storage information that is storage-specific information such as information on the firmware (FW) operating on the apparatus, and migration support information that is information for identifying migration destination CTLs capable of accepting migration (apparatus model information on the migration destination CTLs or the like).

The UI management device configuration information 11 includes basic information for accessing the device, such as internet protocol (IP) addresses, user names, and passwords, as well as the basic settings of the hardware of the storage system and information that is setting information on a management software (GUI) configured to set fault monitoring or the like and necessary for using the GUI in the migration destination CTL with the same settings as the migration source CTL.

The forced restore target information 9, the storage configuration information 10, and the UI management device configuration information 11 are collectively referred to as "control information." Here, the control information refers to general information necessary for the storage controller to execute data input/output (I/O) to the drive box according to commands from the host computer 4, such as information indicating the configuration of the drive box, information indicating the states of logical volumes (logical units), and information indicating the state of processing on volumes or data.

Through Migration Procedure 1, the control information is stored in the backup disk while the migration source CTL is still operating. The information stored in the backup disk 7 remains even when the power of the storage is turned off. Thus, with the necessary information stored in the backup disk 7, when the power of the migration source CTL is turned on, the information stored in the backup disk 7, which had been stored in the storage shared memory, is written back to the storage shared memory 6, thereby allowing the migration source CTL to operate again in the same state as before the power-off.

However, when input/output is resumed in the migration source CTL and the storage shared memory 6 is updated, it is necessary to transfer the information in the storage shared memory to the internal disk of the storage maintenance PC 2 once again.

Figure 3:
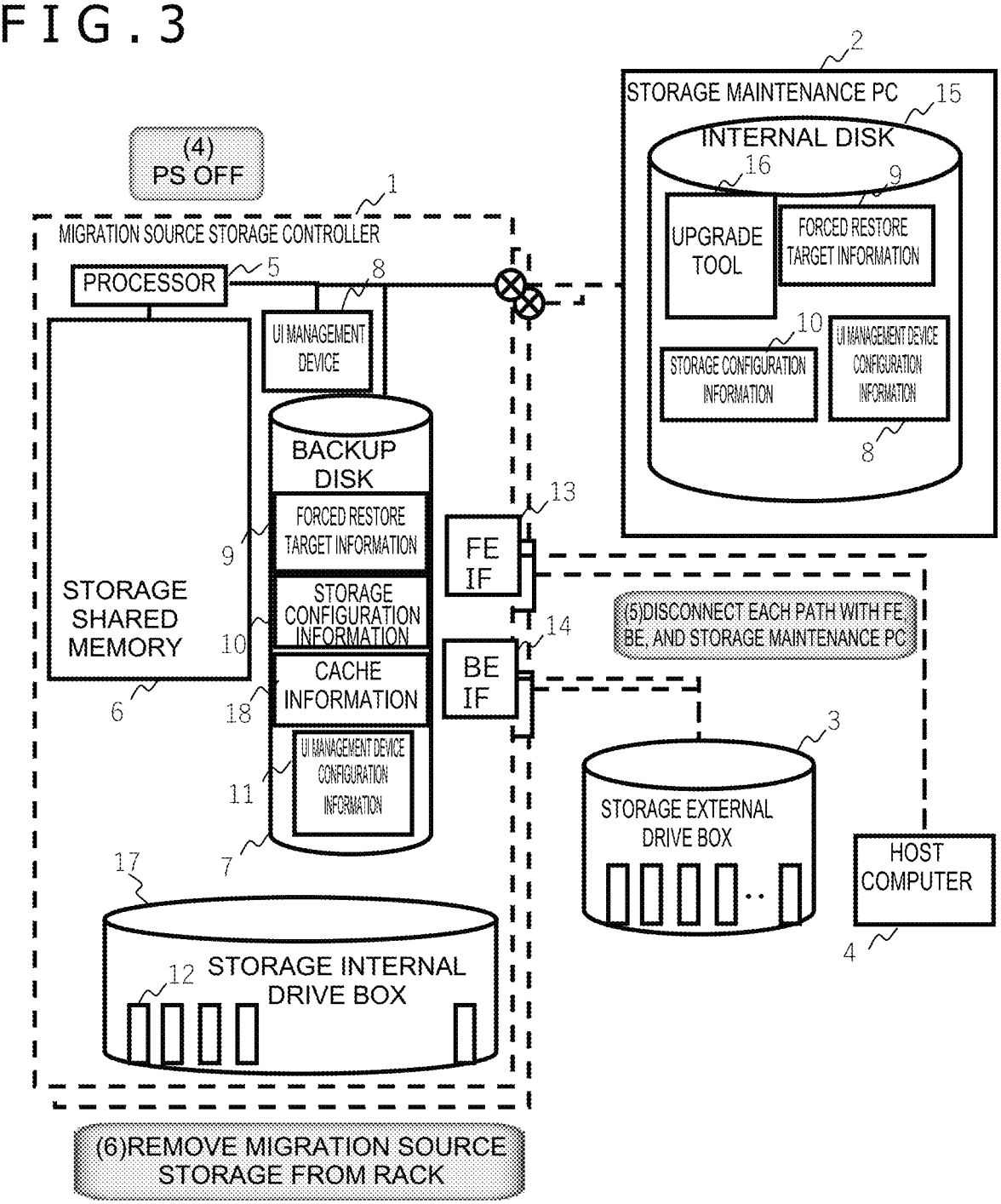
FIG. 3 is Migration Procedure 2 in the embodiment of the present invention.

FIG. 3 illustrates Migration Procedure 2 that is the processing from the power-off of the migration source CTL to the relocation of the disk drives. The processor 5 turns off the power of the migration source CTL (processing (4)), disconnects the communication path with the host computer 4 connected via the FEIF 13, disconnects the communication path with the storage external drive box 3 connected via the BEIF 14, and disconnects the communication path with the storage maintenance PC 2 (processing (5)). When Migration Procedure 2 is completed, the migration source CTL stops operating and no longer accepts and processes instructions on data input/output to the drives from the host computer 4.

An operator confirms that the power of the migration source CTL has been turned off and removes all the disk drives 12 set in the storage internal drive box 17 of the migration source CTL (processing (6)). At this time, since the order of the disk drives 12 set within the storage internal drive box is necessary when the disk drives 12 are set in the storage internal drive box of the migration destination CTL, it is necessary to record the disk drives and the set positions.

Figure 4:
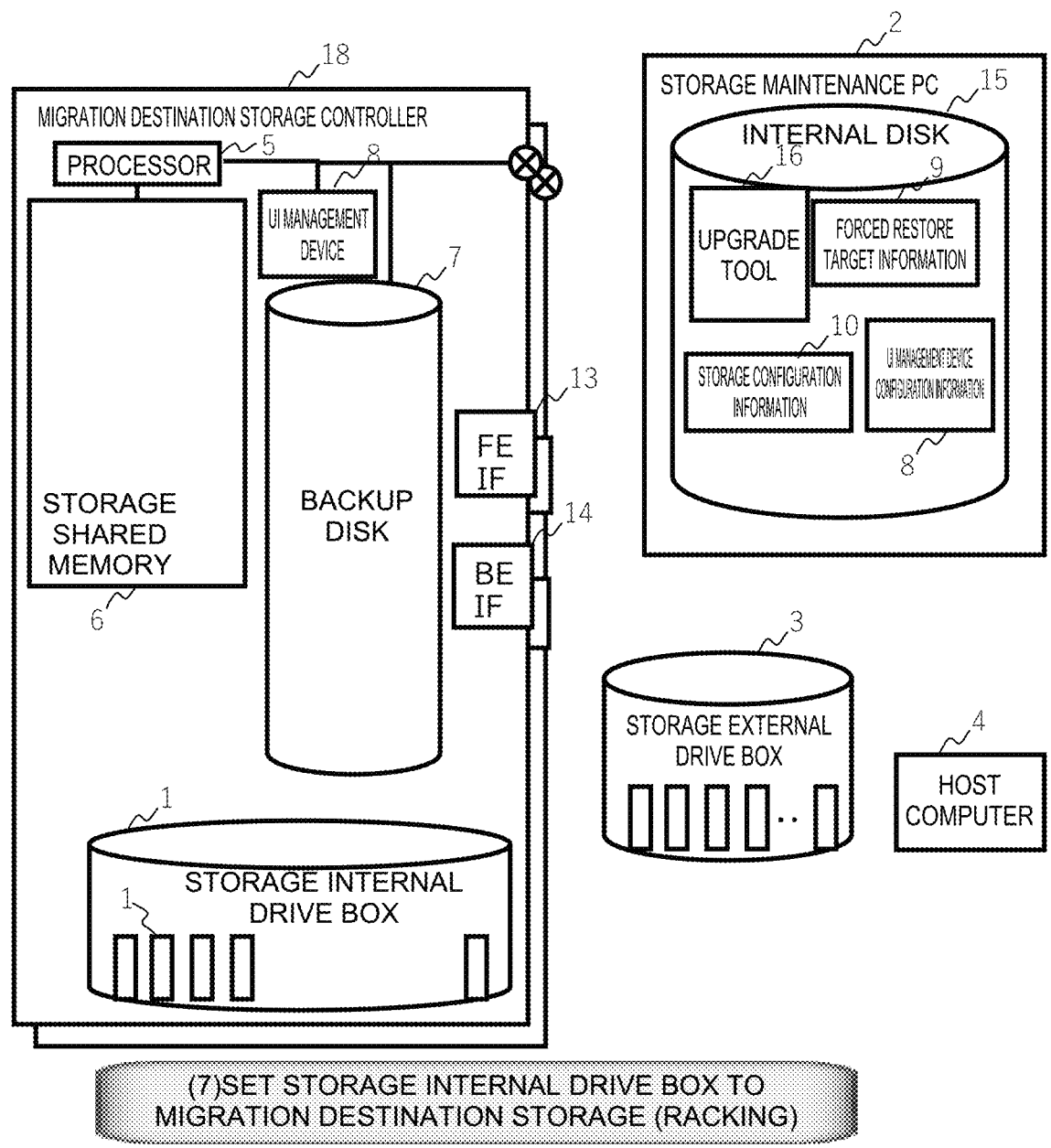
FIG. 4 is Migration Procedure 3 in the embodiment of the present invention.

FIG. 4 illustrates Migration Procedure 3 that involves installing the storage internal drive box of the migration source CTL to the installation location in a migration destination storage controller 18 (hereinafter referred to as "migration destination CTL"). Note that the migration destination CTL has a similar configuration to the migration source CTL. Further, FIG. 4 illustrates two systems of the migration destination CTLs, but both the systems have identical configurations. Each system is provided in correspondence with a corresponding one of the systems of the migration source CTLs and performs migration with respect to the associated migration source CTL.

After removing the disk drives from the migration source CTL, the operator sets the storage internal drive box in the migration destination CTL 18 at the location corresponding to the location at which the storage internal drive box has been located in the migration source CTL (racking) (processing (7)). This allows for the exchange to the new storage without changing the installation position of the rack.

Figure 5:
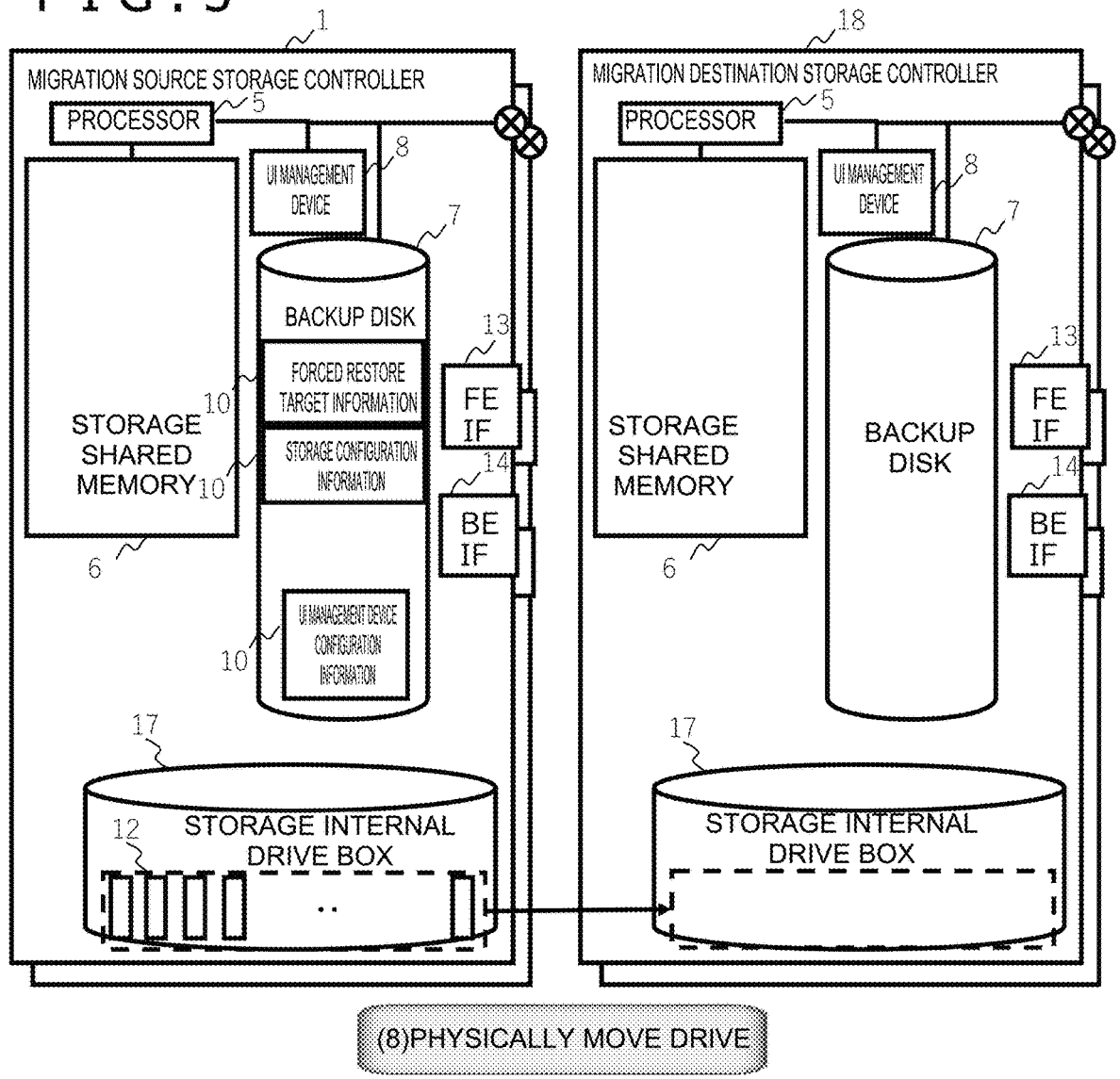
FIG. 5 is Migration Procedure 4 in the embodiment of the present invention.

FIG. 5 illustrates Migration Procedure 4 that involves relocating the internal drives from the migration source storage to the migration destination storage. The operator sets the disk drives 12 removed in Migration Procedure 2 in the internal disk drive box of the migration destination CTL, which has undergone racking in Migration Procedure 3, in the order in which the disk drives 12 have been set in the migration source CTL (processing (8)).

Figure 6:
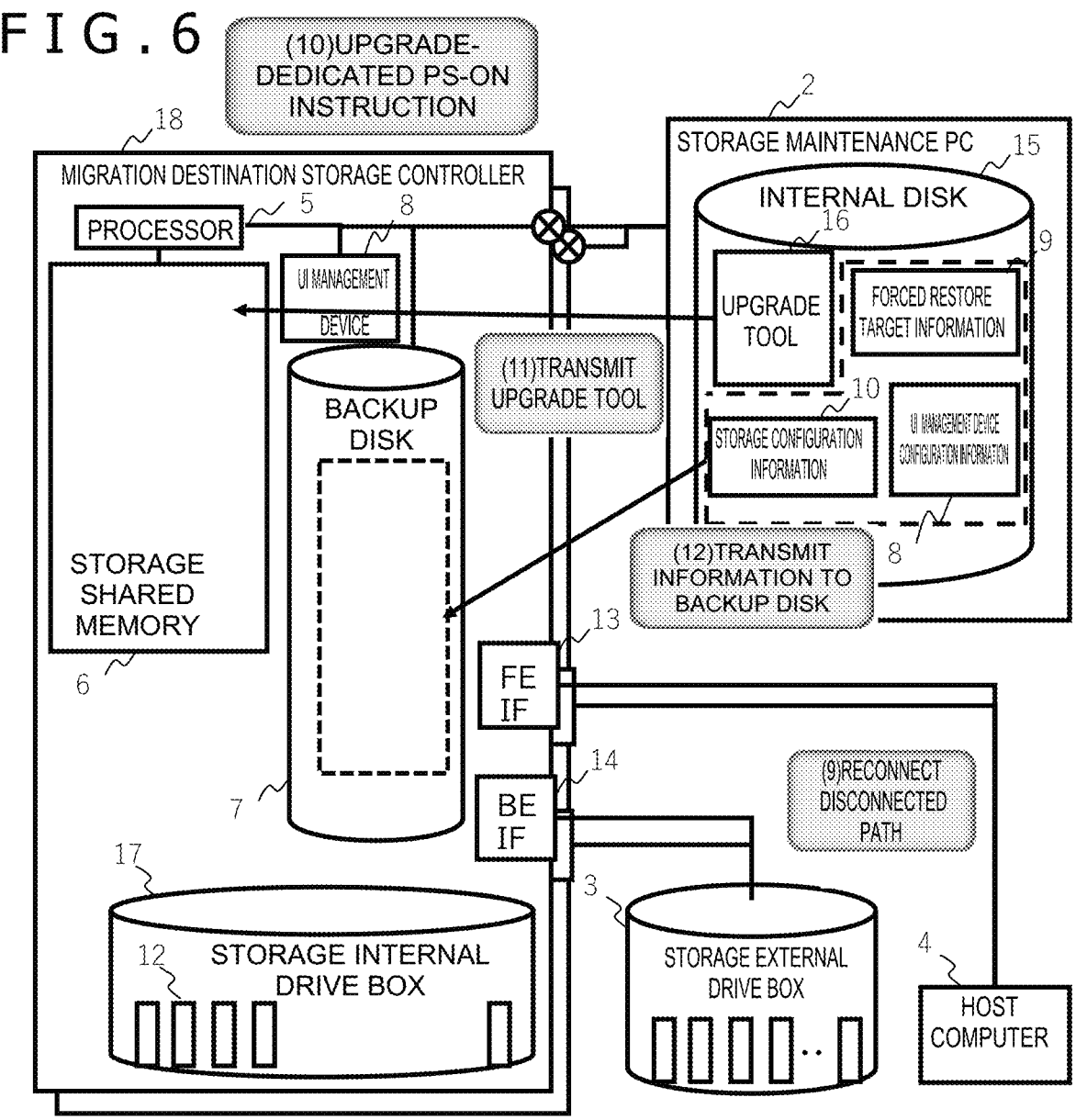
FIG. 6 is Migration Procedure 5 in the embodiment of the present invention.

FIG. 6 illustrates Migration Procedure 5 that involves reconnecting various communication paths and the migration processing of various types of data. First, the storage maintenance PC 2 reconnects the communication paths with the storage maintenance PC 2 between the host computer 4 and the storage external drive box 3, which have been disconnected (processing (9)). Next, the storage maintenance PC 2 transmits a controller migration-dedicated PS-ON instruction to the migration destination CTL (processing (10)). When receiving the controller migration-dedicated PS-ON instruction, the processor 5 of the migration destination CTL executes the pieces of processing (11) to (15) described below.

When receiving the controller migration-dedicated PS-ON instruction, the migration destination CTL installs the upgrade tool 16 from the internal disk of the storage maintenance PC 2 into the storage shared memory 6 of the processor 5 of the migration destination CTL (processing (11)).

The processor 5 executes the upgrade tool 16 to copy the forced restore target information 9, the storage configuration information 10, and the UI management device configuration information 11 from the internal disk 15 of the storage maintenance PC 2 to the backup disk 7 of the migration destination CTL (processing (12)).

Figure 7:
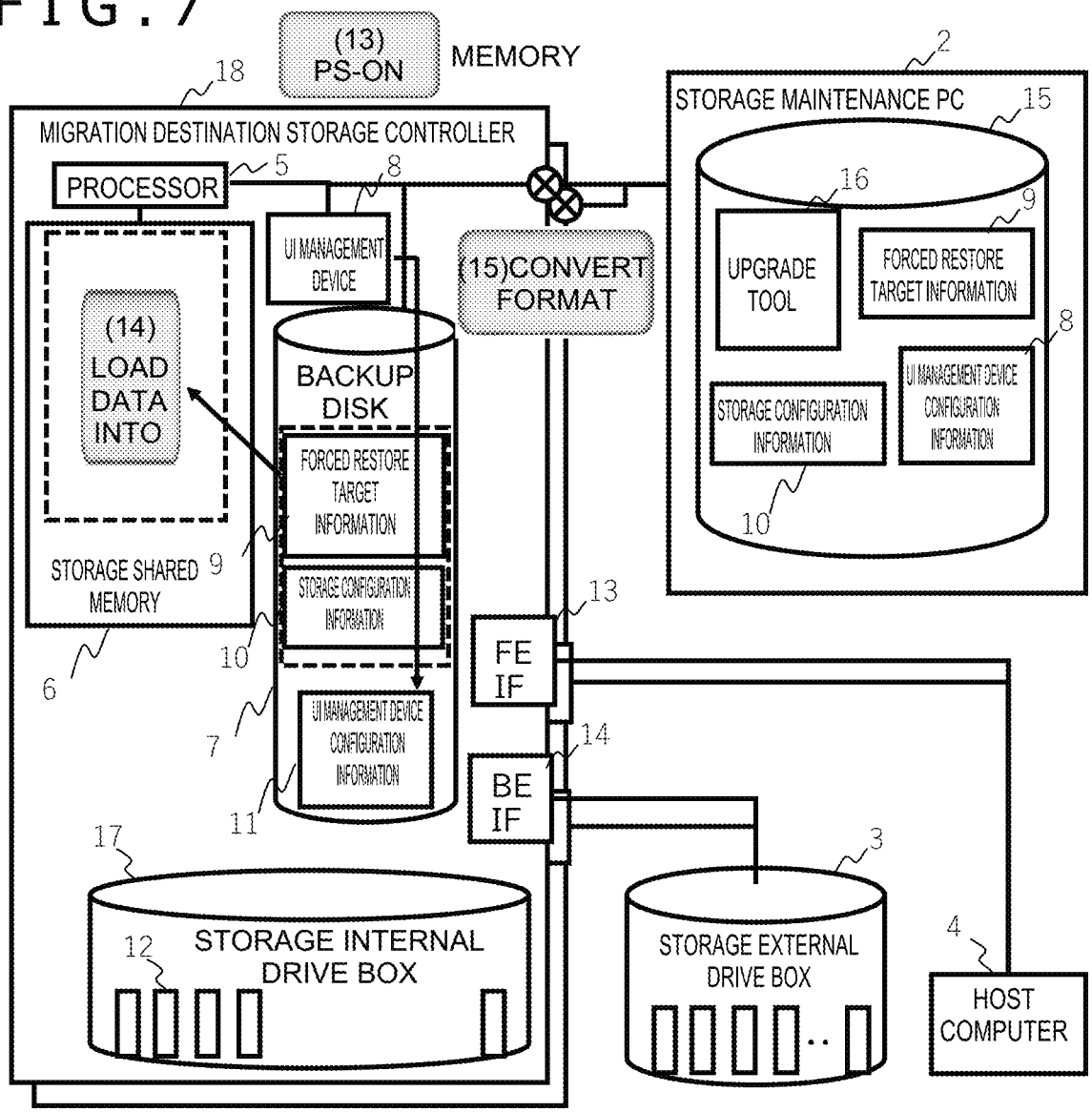
FIG. 7 is Migration Procedure 6 in the embodiment of the present invention.

FIG. 7 illustrates Migration Procedure 6 that involves providing a PS-ON for the migration destination storage and loading data into the storage shared memory. When completing storing the data in the backup disk 7, the processor 5 provides a PS-ON for the migration destination CTL to restart the migration destination CTL (processing (13)).

When the PS-ON is activated, the processor 5 loads data, excluding the UI management device configuration information 11, from the backup disk 7 into the storage shared memory 6 (processing (14)). Before writing the data to the storage shared memory 6, it is necessary to convert the data to a format compatible with the migration destination CTL, that is, to a format compatible with the software executed by the processor 5. The processor 5 may convert the formats of the forced restore target information 9 and the storage configuration information 10 using the upgrade tool 16 when copying the information to the backup disk 7. Further, in the conversion using the upgrade tool 16, the conversion method may be determined by referring to the storage information included in the storage configuration information on the migration source CTL and the migration destination CTL, for example, thereby identifying a format compatible with both the CTLs.

In the loading into the storage shared memory 6, the data converted in the migration source CTL may be transmitted via the storage maintenance PC, or the data may be converted in the storage maintenance PC to be transmitted. The data may be transmitted to the backup disk of the migration destination CTL and then loaded into the storage shared memory 6 while being converted.

When the loading into the storage shared memory is completed, the UI management device 8 accesses the UI management device configuration information 11 in the backup disk and converts the UI management device configuration information 11 to an appropriate format compatible with the migration destination CTL (processing (15)).

Figure 8:
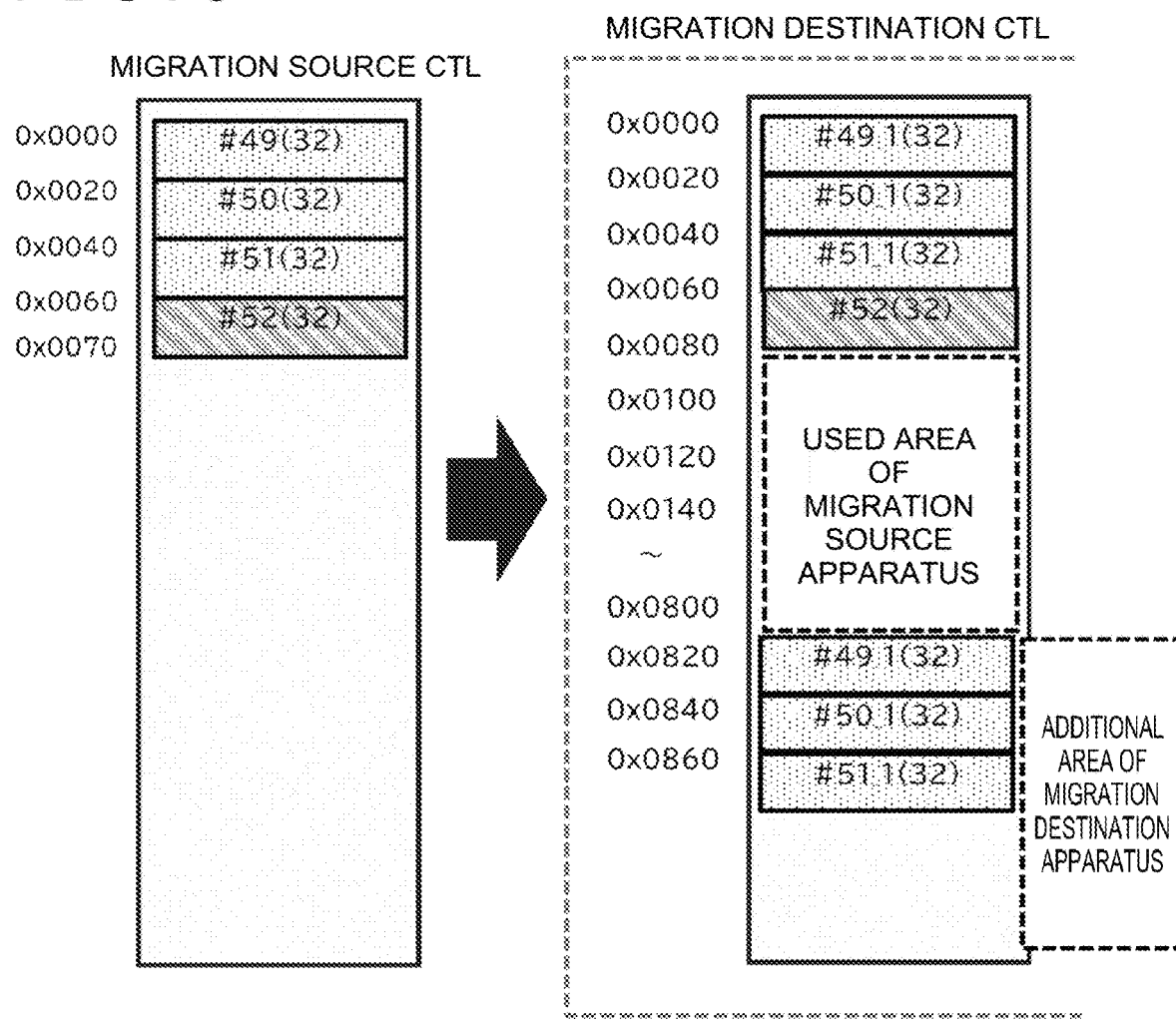
FIG. 8 is Storage Area Usage Example 1 of a migration destination storage system in the embodiment of the present invention.
Figure 9:
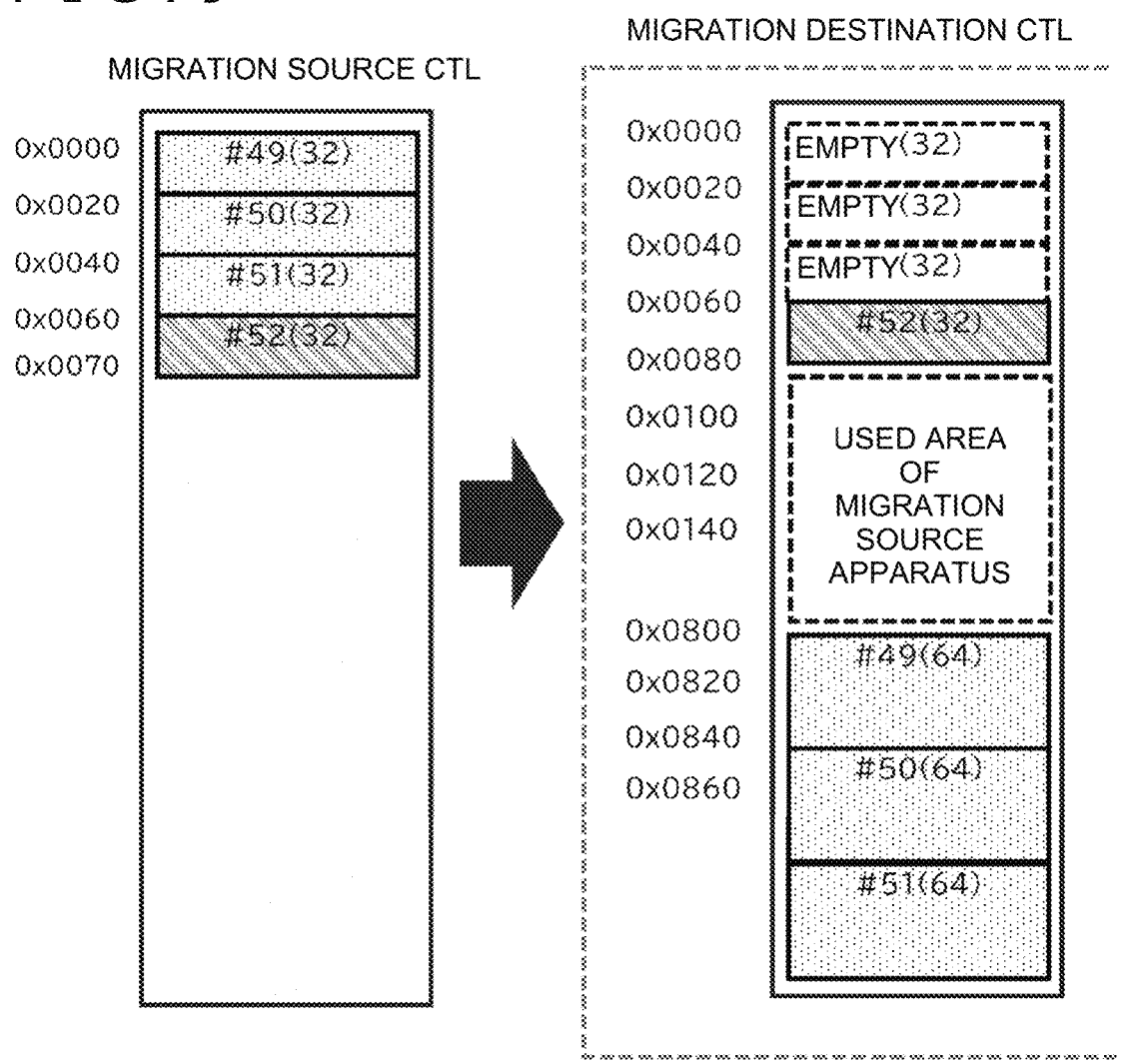
FIG. 9 is Storage Area Usage Example 2 in the migration destination storage system in the embodiment of the present invention.

The format may be converted as in Storage Area Usage Example 1 of the migration destination storage system illustrated in FIG. 8, in which the information is expanded while maintaining the format of the migration source CTL. However, when there is a size change, it is necessary to reallocate the information in an area of the migration destination CTL that does not correspond to the area of the migration source CTL in which the information has been stored, as illustrated in FIG. 9.

In Migration Procedure 4 illustrated in FIG. 5, it has been described that the disk drives are set to the drive box of the migration destination CTL at the positions corresponding to the positions at which the disk drives have been set in the migration source CTL. However, due to an error, there is a possibility that some of the disk drives may be set at incorrect positions in the drive box.

To address this problem, in Migration Procedure 6 illustrated in FIG. 7, when the migration destination CTL is restarted, the processor 5 confirms whether the disk drives have been set at the correct positions, using the correspondence information indicating the correspondence between the slot numbers corresponding to location information on the disk drives and the serial numbers of the disk drives, which are included in the storage configuration information 10. When some of the disk drives have been set at incorrect positions, the processor 5 transmits information regarding the incorrect positions at which the disk drives have been set to the storage maintenance PC 2 together with the correspondence information. The storage maintenance PC 2 outputs a drive position error notification screen 30 as illustrated in FIG. 10 through a display apparatus (not illustrated) such as a display device, thereby prompting the user to set the disk drives at the correct positions corresponding to the positions at which the disk drives have been set in the migration source CTL.

In the notification screen 30, pieces of information on the following are displayed in association with each other: a controller chassis schematic diagram 31 for visually indicating the positions of disk drives set at incorrect positions, a disk drive location 33, a slot 34, a state 35 for displaying a white circle and "Normal" for disk drives set at the correct positions, and a black circle and "Blocked" for disk drives set at incorrect positions, a usage 36 for indicating the usage statuses of disk drives, a drive type/RPM/capacity section 37, a drive type code 38, and a notification 39 for indicating the correct slots for disk drives set at wrong positions.

Further, a warning message 40 stating, for example, "The drive is not installed at the correct position. Please reinstall the drive in the slot displayed in the "notification" for each drive." is output.

FIG. 11 is an example of a flowchart illustrating data transfer processing from the migration source storage. The storage maintenance PC transmits a PS-OFF, which is a controller migration-dedicated power-off instruction, to the processor of the migration source CTL (S1). When receiving the PS-OFF, the processor of the migration source CTL transmits a notification of data transmission start to the storage maintenance PC (S2). Following Migration Procedure 1 illustrated in FIG. 2, the processor of the migration source CTL transmits the forced restore target information 9, the storage configuration information 10, and the UI management device configuration information 11 to the storage maintenance PC, and the storage maintenance PC performs data reception processing (S3).

When completing the data transmission to the storage maintenance PC, the processor of the migration source CTL transmits a notification of data transmission completion (S4), and the storage maintenance PC checks errors in the transmitted data (S5). In a case where there is no error in the data (No in S6), the storage maintenance PC performs data reception completion processing (S7), instructs the migration source CTL to start apparatus stop processing (S8), and terminates the data migration processing in the migration source CTL. The processor of the migration source CTL executes the processing (4) of Migration Procedure 2 illustrated in FIG. 3 thereafter and stops operating. Whether the migration source CTL has stopped operating can be confirmed by a display state light emitting diode (LED) provided on the migration source CTL, for example.

In a case where there are errors in the data (Yes in S6), the storage maintenance PC outputs a data resend request to the migration source CTL, and the processor of the migration source CTL transmits the forced restore target information 9, the storage configuration information 10, and the UI management device configuration information 11 once again (S9). If errors persist after repeated data transmissions up to a defined number of times (S10), the storage maintenance PC transmits a notification indicating that the failure has occurred the defined number of times to the migration source CTL. The processor of the migration source CTL outputs a communication failure log to the storage maintenance PC (S11), terminates the data migration abnormally (S12), and performs rollback processing in the migration source CTL.

Figure 12:
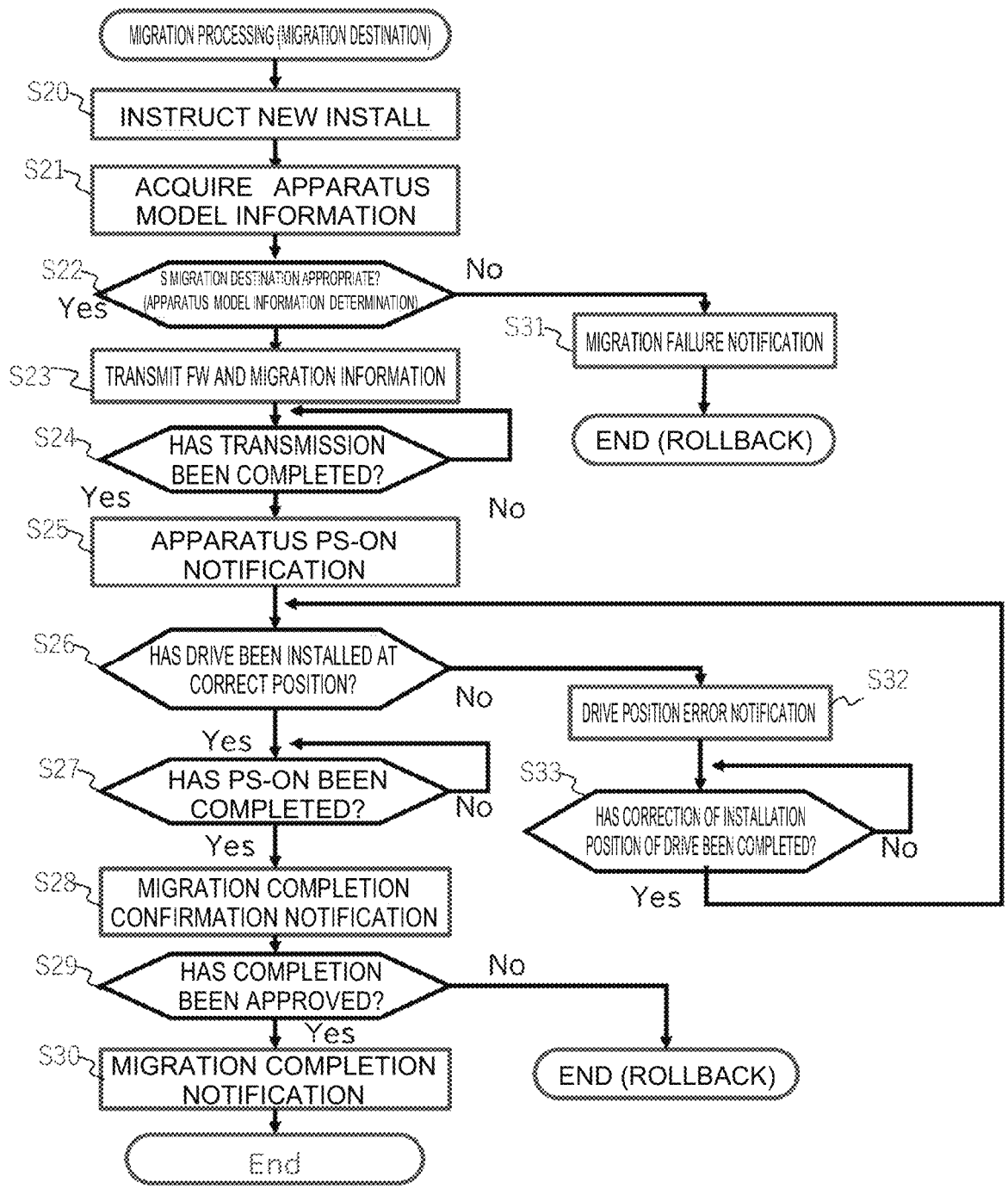
FIG. 12 is an example of a flowchart illustrating data transfer processing to a migration destination storage and operation processing in the embodiment of the present invention.

FIG. 12 is an example of a flowchart illustrating data transfer processing to the migration destination storage and operation processing. Note that it is assumed that, prior to each processing of FIG. 12, the installation of the storage internal drive box of the migration source CTL to the migration destination CTL through Migration Procedure 3 illustrated in FIG. 4 and the relocation of the internal drives from the migration source CTL to the migration destination CTL through Migration Procedure 4 illustrated in FIG. 5 are performed by the operator, the pieces of processing (9) and (10) of Migration Procedure 6 illustrated in FIG. 6 are executed by the storage maintenance PC 2, and a controller migration-dedicated PS-ON instruction is transmitted to the migration destination CTL.

The storage maintenance PC transmits the upgrade tool for controller migration and an installation instruction for the tool in question from the storage maintenance PC to the processor of the migration destination CTL (S20). The storage maintenance PC also acquires the apparatus model information from the storage configuration information on the migration destination CTL (S21). Moreover, the storage maintenance PC refers to the migration support information, which indicates migration destination CTLs capable of accepting migration of the forced restore target information 9, from the acquired apparatus model information, thereby determining whether the migration destination is appropriate (S22).

In other words, in Step S22, the storage maintenance PC determines whether the control information on the migration source CTL can be converted to a format compatible with the migration destination CTL or not. The storage maintenance PC may store a table of pairs each including apparatus model information on a migration source CTL and apparatus model information on migration destination CTLs capable of accepting migration from the migration source CTL in question and refer to this table in the determination.

When the migration destination is not appropriate, the storage maintenance PC sends a migration failure notification to the migration destination CTL (S31), and the migration destination CTL performs rollback processing.

When determining that the migration destination is appropriate, the storage maintenance PC transmits the FW information and the migration information such as the forced restore target information 9, the storage configuration information 10, and the UI management device configuration information 11 to the migration destination CTL (S23). In a case where the storage maintenance PC converts migration information, the storage maintenance PC performs the conversion at this stage. When completing the transmission (S24), the storage maintenance PC notifies the migration destination CTL of an apparatus PS-ON, thereby restarting the migration destination CTL (S25). The processor of the migration destination CTL determines whether the disk drives have been installed at the correct positions after the restart (S26). When there are errors, the processor outputs the screen of FIG. 10 to the storage maintenance PC, thereby prompting the operator to set the disk drives in the correct slots.

Whether the disk drives have been set in the correct slots may be determined as follows: the migration source CTL stores correspondence information in which the configuration information is stored in association with the identifiers of the disk drives and the slot identifiers indicating the insertion order of the disk drives, and the migration destination CTL reads the identifier of a disk drive from the disk drive when powered on first, and compares the identifier with the correspondence information in the storage configuration information read from the storage maintenance PC 2. The migration destination CTL may output a warning message when the disk drive in question is not set in the slot indicated by the correspondence information.

When it is determined in S26 that the disk drives have been installed at the correct positions, the storage maintenance PC performs a PS-ON completion determination to determine whether the restart of the migration destination CTL has been completed on the basis of whether there is a notification indicating the completion of the restart of the migration destination CTL (S27). When determining that the restart has been completed, the storage maintenance PC outputs a migration completion confirmation notification through message display or the like (S28).

The storage maintenance PC determines whether the operator has provided approval input for the migration completion in response to the migration completion confirmation notification (S29). When receiving approval input for the migration completion, the storage maintenance PC outputs a migration completion notification (S30). When receiving no approval input, the storage maintenance PC performs a rollback of the migration destination CTL.

When it is determined in S26 that some of the drives have been installed at incorrect positions, the storage maintenance PC outputs a drive position error notification as illustrated in FIG. 10 (S32) and awaits correction of the drive installation positions by the operator (S33). When determining that the correction of the installation positions of the drives has been completed, the migration destination CTL returns to S26 to confirm the installation positions of the drives.

What is claimed is:

1. A storage migration method for a storage system, the storage system including:
   a plurality of storage controllers each including a processor and a memory; and
   a plurality of storage media configured to store data, the plurality of storage media each being managed by a corresponding one of the plurality of storage controllers,
   wherein each of the plurality of storage controllers i) requests data access and ii) transmits and receives the data with respect to a host computer,
   the processors of the plurality of storage controllers process data input or output to the plurality of storage media by the host computer,
   a plurality of the memories of the storage controllers hold control information referred to by the processors to access the data stored in the storage media,
   a storage migration control apparatus is connected to the plurality of storage controllers,
   the storage migration control apparatus transmits, to a migration source storage controller among the plurality of storage controllers, a transfer instruction for the control information,
   a processor of the migration source storage controller transmits, on a basis of the transfer instruction, the control information to the storage migration control apparatus,
   the storage migration control apparatus transmits, to a migration destination storage controller, different from the migration source storage controller, among the plurality of storage controllers, a migration instruction for the control information and the control information, and
   a processor of the migration destination storage controller determines, on a basis of the control information received, whether a storage medium managed by the migration source storage controller has been relocated to the migration destination storage controller.

2. The storage migration method according to claim 1, wherein the control information includes storage configuration information for reusing the storage medium managed by the migration source storage controller in one of the storage controllers different from the migration source storage controller.

3. The storage migration method according to claim 1, wherein the control information includes migration support information regarding a storage controller capable of accepting migration of the control information from the migration source storage controller, and
   the storage migration control apparatus determines whether the control information is migratable to the migration destination storage controller on a basis of the migration support information received from the migration source storage controller and transmits, when determining that the control information is migratable, the migration instruction for the control information and the control information to the migration destination storage controller.

4. The storage migration method according to claim 2, wherein each of the storage controllers includes a storage medium storage unit configured to store the plurality of storage media and stores correspondence information between identification information and a storage position in the storage medium storage unit regarding each of the storage media in the storage configuration information, and the migration destination storage controller determines, when determining relocation of the storage media, on a basis of the correspondence information received from the migration source storage controller, whether the plurality of storage media are stored in the storage medium storage unit at respective storage positions corresponding to positions at which the storage media have been stored in the migration source storage controller.

5. The storage migration method according to claim 4, wherein the identification information on the storage media is a serial number.

6. The storage migration method according to claim 4, Wherein, when the storage media have failed to be stored at the storage positions in the storage medium storage unit based on the correspondence information, which has been received from the migration source storage controller, in the migration destination storage controller, the storage migration control apparatus receives a notification from the migration destination storage controller and outputs the storage positions in the storage medium storage unit based on the correspondence information.

7. The storage migration method according to claim 1, wherein the storage migration control apparatus disconnects a communication path with the migration source storage controller after receiving the control information from the migration source storage controller.

8. The storage migration method according to claim 2, wherein the processor of the migration destination storage controller converts the storage configuration information on the migration source storage controller to a format compatible with software executed by the processor and stores the storage configuration information in a memory in the migration destination storage controller.

9. A storage system comprising:

a plurality of storage controllers each including a processor and a memory; and a plurality of storage media configured to store data, the storage media each being managed by a corresponding one of the storage controllers, wherein each of the plurality of storage controllers requests data access and transmits and receives data with respect to a host computer, a plurality of the processors of the storage controllers process data input or output to the storage media by the host computer, a plurality of the memories of the storage controllers hold control information referred to by the processors to access the data stored in the storage media, a storage migration control apparatus is connected to the plurality of storage controllers, the storage migration control apparatus transmits a transfer instruction for the control information to a migration source storage controller among the plurality of storage controllers and transmits, to a migration destination storage controller different from the migration source storage controller among the plurality of storage controllers, the migration instruction for the control information and the control information on the migration source storage controller, a processor of the migration source storage controller transmits, on a basis of the transfer instruction, the control information to the storage migration control apparatus, and a processor of the migration destination storage controller determines whether a storage medium managed by the migration source storage controller has been relocated to the migration destination storage controller on a basis of the control information received from the storage migration control apparatus.

* * * * *